United States Patent
Zheng

(10) Patent No.: US 11,210,502 B2
(45) Date of Patent: Dec. 28, 2021

(54) COMPARISON METHOD AND APPARATUS BASED ON A PLURALITY OF FACE IMAGE FRAMES AND ELECTRONIC DEVICE

(71) Applicant: Advanced New Technologies Co., Ltd., Grand Cayman (KY)

(72) Inventor: Dandan Zheng, Zhejiang (CN)

(73) Assignee: Advanced New Technologies Co., Ltd., George Town (KY)

( * ) Notice: Subject to any disclaimer, the term of this patent is extended or adjusted under 35 U.S.C. 154(b) by 0 days.

(21) Appl. No.: 17/191,039

(22) Filed: Mar. 3, 2021

(65) Prior Publication Data
US 2021/0192190 A1 Jun. 24, 2021

Related U.S. Application Data

(63) Continuation of application No. PCT/CN2019/111989, filed on Oct. 18, 2019.

(30) Foreign Application Priority Data

Dec. 3, 2018 (CN) .......................... 201811468225.4

(51) Int. Cl.
*G06K 9/00* (2006.01)
*G06T 7/00* (2017.01)

(52) U.S. Cl.
CPC ..... *G06K 9/00288* (2013.01); *G06K 9/00926* (2013.01); *G06T 7/0002* (2013.01);
(Continued)

(58) Field of Classification Search
CPC ............ G06K 9/00288; G06K 9/00926; G06T 7/0002; G06T 2207/30168; G06T 2207/30201
(Continued)

(56) References Cited

U.S. PATENT DOCUMENTS 5,982,912 A * 11/1999 Fukui ................. G06K 9/00221
382/115
8,538,141 B2 * 9/2013 Sakimura ............. G06K 9/6253
382/159
(Continued)

FOREIGN PATENT DOCUMENTS

| CN | 102096805 A | 6/2011 |
| CN | 102137077 A | 7/2011 |

(Continued)

OTHER PUBLICATIONS

Qi, Xuan et al., "GPU-Accelerated Key Frame Analysis for Face Detection in Video", IEEE 7th International Conference on Cloud Computing Technology and Science, 2015, 6 pages.
(Continued)

*Primary Examiner* — Sheela C Chawan
(74) *Attorney, Agent, or Firm* — Seed IP Law Group LLP

(57) ABSTRACT

Implementations of the present specification disclose a comparison method and apparatus based on a plurality of face image frames and an electronic device. The method includes: obtaining a plurality of face image frames of a target object; selecting a first face image with a highest quality score from the plurality of face image frames, and adding the first face image to a candidate image set; in response to that a number of images in the candidate image set is less than a predetermined value, iteratively selecting, from the plurality of face image frames, a second face image that has a maximum average difference from all face images in the candidate image set in a predetermined parameter, to add the second face image to the candidate image set; and comparing the face images in the candidate image set with a stored face image of the target object.

20 Claims, 3 Drawing Sheets

(52) U.S. Cl.
CPC ............... *G06T 2207/30168* (2013.01); *G06T 2207/30201* (2013.01)

(58) Field of Classification Search
USPC ....... 382/100, 103, 115, 118, 155, 151, 168, 382/171, 172, 181, 190, 199, 218, 224, 382/232, 254, 276, 305, 209
See application file for complete search history.

(56) References Cited

U.S. PATENT DOCUMENTS

| | | | |
|---|---|---|---|
| 8,885,942 B2* | 11/2014 | Tsukidate | G06F 16/58 |
| | | | 382/190 |
| 9,693,050 B1 | 6/2017 | Madhani et al. | |
| 10,339,368 B2* | 7/2019 | Yu | G06T 3/40 |
| 2011/0274330 A1 | 11/2011 | Mori et al. | |
| 2014/0063236 A1 | 3/2014 | Shreve et al. | |
| 2016/0019420 A1 | 1/2016 | Feng et al. | |
| 2017/0330028 A1 | 11/2017 | Lo et al. | |
| 2017/0332950 A1* | 11/2017 | Yu | G07C 9/37 |
| 2018/0039821 A1 | 2/2018 | Gren et al. | |
| 2018/0204053 A1* | 7/2018 | Yokozeki | G06T 7/20 |
| 2018/0239954 A1* | 8/2018 | Hamada | G08B 13/196 |
| 2018/0276454 A1* | 9/2018 | Han | G06K 9/4628 |
| 2019/0026544 A1* | 1/2019 | Hua | A61B 5/1128 |
| 2019/0371189 A1* | 12/2019 | Hiraide | G06K 9/00241 |

FOREIGN PATENT DOCUMENTS

| | | | |
|---|---|---|---|
| CN | 103942525 | A | 7/2014 |
| CN | 104462891 | A | 3/2015 |
| CN | 105005779 | A | 10/2015 |
| CN | 107578017 | A | 1/2018 |
| CN | 107633209 | A | 1/2018 |
| CN | 107730483 | A | 2/2018 |
| CN | 108427911 | A | 8/2018 |
| CN | 108765394 | A | 11/2018 |
| CN | 110020581 | A | 7/2019 |

OTHER PUBLICATIONS

Qi, Xuan et al., "CNN Based Key Frame Extraction for Face in Video Recognition", IEEE 4th International Conference on Identity, Security, and Behavior Analysis (ISBA), 2018, 8 pages.

* cited by examiner

COMPARISON METHOD AND APPARATUS BASED ON A PLURALITY OF FACE IMAGE FRAMES AND ELECTRONIC DEVICE

BACKGROUND

Technical Field

The present specification pertains to the field of computer software technologies, and in particular, to a comparison method and apparatus based on a plurality of face image frames and an electronic device.

Description of the Related Art

Currently, with the emergence of payment terminals in payment scenarios, face-scanning payment has become a trend.

During common face-scanning payment, after image acquisition, a face image frame with the highest quality score is selected and compared with a stored face image. However, because a face image frame is selected, by using only a quality score algorithm, from images obtained by a camera while the quality score algorithm has errors, the selected face image frame may have defects such as blur and occlusion. In addition, the amount of information in a single face image frame is limited, and the comparison accuracy cannot be maximized.

BRIEF SUMMARY

The present specification provides a comparison method and apparatus based on a plurality of face image frames and an electronic device. The techniques have many technical advantages. For example, the techniques improve the comparison accuracy of face images.

According to a first aspect, a comparison method based on a plurality of face image frames is provided, including: obtaining a plurality of face image frames of a target object; selecting a first face image with a highest quality score from the plurality of face image frames, and adding the first face image to a candidate image set; in response to that a number of images in the candidate image set is less than a predetermined value, iteratively selecting, from the plurality of face image frames, a second face image that has a maximum average difference from all face images in the candidate image set in a predetermined parameter, to add the second face image to the candidate image set; and comparing the face images in the candidate image set with a stored face image of the target object.

According to a second aspect, a comparison apparatus based on a plurality of face image frames is provided, including: an acquisition module, configured to obtain a plurality of face image frames of a target object; a first selection module, configured to select a first face image with a highest quality score from the plurality of face image frames, and add the first face image to a candidate image set; a second selection module, configured to: in response to that a number of images in the candidate image set is less than a predetermined value, iteratively select, from the plurality of face image frames, a second face image that has a maximum average difference from all face images in the candidate image set in a predetermined parameter, to add the second face image to the candidate image set; and a comparison module, configured to compare the face images in the candidate image set with a stored face image of the target object.

According to a third aspect, an electronic device is provided, including: a processor; and a memory, configured to store computer-executable instructions, where when the executable instructions are executed, the processor is enabled to perform the following operations: obtaining a plurality of face image frames of a target object; selecting a first face image with a highest quality score from the plurality of face image frames, and adding the first face image to a candidate image set; in response to that a number of images in the candidate image set is less than a predetermined value, iteratively selecting, from the plurality of face image frames, a second face image that has a maximum average difference from all face images in the candidate image set in a predetermined parameter, to add the second face image to the candidate image set; and comparing the face images in the candidate image set with a stored face image of the target object.

According to a fourth aspect, a computer-readable storage medium storing one or more programs is provided, where the one or more programs are executed by an electronic device including a plurality of application programs, the electronic device is enabled to perform the following operations: obtaining a plurality of face image frames of a target object; selecting a first face image with a highest quality score from the plurality of face image frames, and adding the first face image to a candidate image set; in response to that a number of images in the candidate image set is less than a predetermined value, iteratively selecting, from the plurality of face image frames, a second face image that has a maximum average difference from all face images in the candidate image set in a predetermined parameter, to add the second face image to the candidate image set; and comparing the face images in the candidate image set with a stored face image of the target object.

It can be seen from the technical solution according to the above implementations of the present specification that a first face image with the highest quality score is selected from a plurality of obtained face image frames of the target object and added to a candidate image set; based on the first face image, a second face image that has a maximum average difference from all face images in the candidate image set in a predetermined parameter is iteratively selected from the plurality of face image frames, and added to the candidate image set, until the number of images in the candidate image set reaches a predetermined value; and then the face images in the candidate image set are compared with a stored face image of the target object, so that it is ensured that the selected face images have a greater difference while the number of candidate face image frames is increased (to ensure sufficient information), thereby avoiding noise and improving the accuracy of comparison results.

BRIEF DESCRIPTION OF THE SEVERAL VIEWS OF THE DRAWINGS

To describe the technical solutions in the implementations of the present specification or in the existing technologies more clearly, the following briefly describes the accompanying drawings needed for describing the implementations or the existing technologies. Clearly, the accompanying drawings in the following descriptions merely show some implementations of the present specification, and a person of ordinary skill in the art can still derive other drawings from these accompanying drawings without innovative efforts.

DETAILED DESCRIPTION

To make a person skilled in the art better understand the technical solutions in the implementations of the present specification, the following clearly and completely describes the technical solutions in the implementations of the present specification with reference to the accompanying drawings in the implementations of the present specification. Clearly, the described implementations are merely some but not all of the implementations of the present specification. Based on the implementations of the present specification, all other implementations derived by a person of ordinary skill in the art without innovative efforts shall fall within the protection scope of the present specification.

Figure 1:
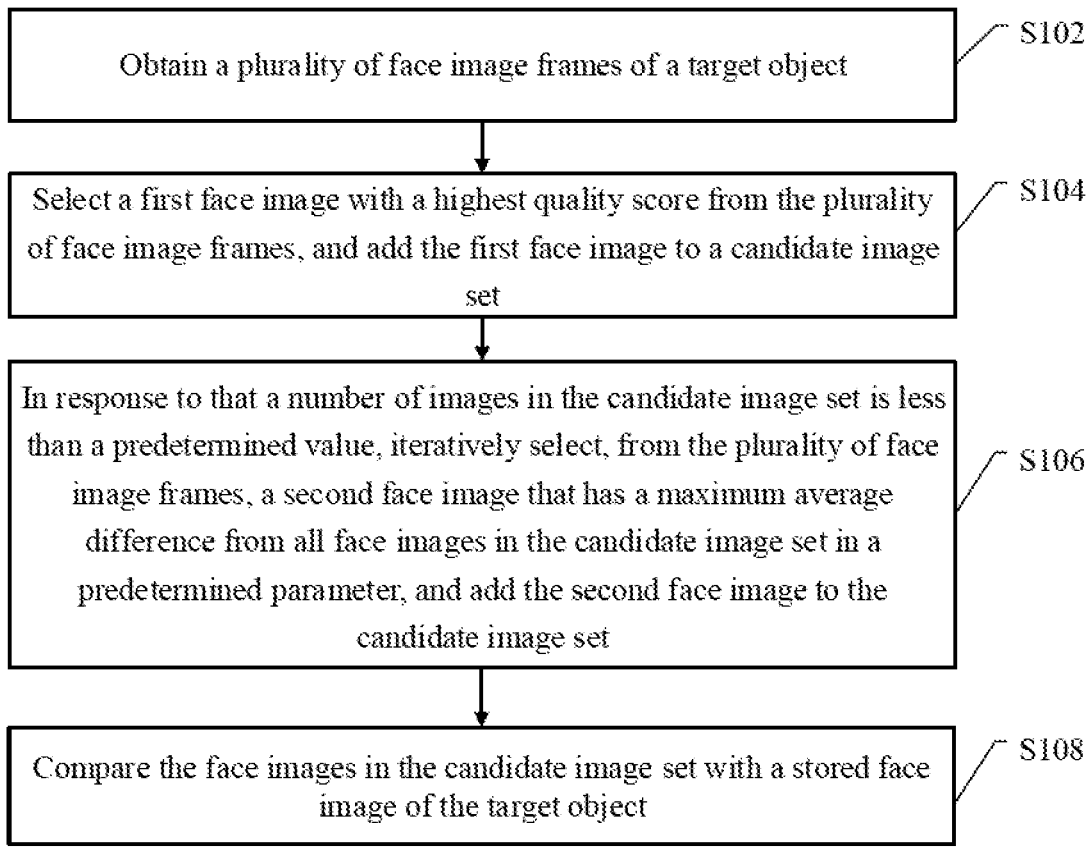
FIG. 1 is a schematic diagram illustrating steps of a comparison method based on a plurality of face image frames according to some implementations of the present specification.

FIG. 1 is a schematic diagram illustrating steps of a comparison method based on a plurality of face image frames according to some implementations of the present specification. The method can be performed by a comparison apparatus based on a plurality of face image frames, which can be specifically a face recognition and comparison apparatus, a payment terminal, a self-service terminal, or the like. The comparison method can include the following steps.

S102: Obtain a plurality of face image frames of a target object.

In some implementations of the present specification, the plurality of face image frames of the target object are face images of the same target user. These face images can be selected based on different criteria, for example, face images of the target object are selected from image frames based on a maximum face logic, or selected from image frames based on a nearest face logic, or determined based on other methods. This is not limited in the present specification.

In some implementations of the present specification, the obtaining a plurality of face image frames of the target object in S102 can include the following operations: tracking each shot of face image frame; and obtaining face images that meet a quality score threshold based on a tracking result, and recording an attribute of each face image frame.

In some implementations, because the image shooting process typically lasts for 2 seconds, to ensure that every face image frame is tracked and all tracked face images are of the same target user, tracking operations can be used. The tracking operations can use a histogram-based tracking algorithm, a MeanShift algorithm, and the like, or other suitable image tracking approaches.

The tracking operations in the present specification locates, through image recognition, the face in the current face image frame shot by a camera, to track the face of an object based on the camera, and to keep the face of the object within the acquisition field of view of the camera.

In some implementations of the present specification, the quality score can be determined by using many evaluation methods. In a solution, for example, the quality score of each face image frame is determined based on the angle, light, and other attributes of the face image frame. The quality score threshold used herein can be the quality score determined based on an empirical value or by using a corresponding algorithm, and is used to select face images with higher image quality, filter out face images with abnormal defects such as occlusion and fuzzy exposure, and effectively dilute an error caused by determining of a face image frame by simply using the quality score. In addition, the attributes of each face image frame (such as quality score, angle, brightness, and light) can be recorded.

In some embodiments, the obtaining face images that meet a quality score threshold based on a tracking result in S102 can include the following operations: obtaining and using a current face image frame as a face image of the target object, in response to that the tracking succeeds and the current face image frame meets the quality score threshold at a same time, where the current face image frame is current at the time when the tracking succeeds.

In some embodiments, the obtaining face images that meet a quality score threshold based on a tracking result in S102 can include the following operations: in response to that the tracking fails and at a same time a current face image frame is successfully matched with a face image that has been obtained prior to the current frame, and the current face image frame meets the quality score threshold, obtaining the current face image frame as a face image of the target object, where the current face image frame is current at the time when the tracking fails; in response to that the tracking fails and at a same time a current face image frame is at least one of: not successfully matched with the face image that has been obtained prior to the current frame, or not meeting the quality score threshold, re-tracking a shot of face image frame, and emptying the candidate image set.

Tracking success can be understood as that the current face image frame located by the camera is the same as the previous face image frame located; that is, the face in the face image is kept within the acquisition field of view of the camera. Accordingly, tracking failure can be understood as that the current face image frame located by the camera is not the same face image as the previous face image frame located; that is, the face in the face image fails to be kept within the acquisition field of view of the camera.

It should be understood that when tracking fails, the current face image frame is compared with face images that have been obtained before the current frame. The comparison can be made based on the ID or other identifiers of the target user (or target object) to determine whether the same target user is still being tracked.

S104: Select a first face image with a highest quality score from the plurality of face image frames, and add the first face image to a candidate image set.

S106: In response to that a number of images in the candidate image set is less than a predetermined value, iteratively select, from the plurality of face image frames, a second face image that has a maximum average difference from all face images in the candidate image set in a predetermined parameter, and add the second face image to the candidate image set.

In some implementations of the present specification, the predetermined parameters can include at least one of following attributes: quality score, angle, brightness, and light;

or, the predetermined parameters can be determined based on at least one of the following attributes: quality score, angle, brightness, and light.

It should be understood that the predetermined parameters can be determined through weighted averaging based on at least one of the following attributes: quality score, angle, brightness, and light.

Herein, a second face image that has a maximum average difference from all face images in the candidate image set in a predetermined parameter is iteratively selected from the plurality of face image frames. For example, when the predetermined value is 4 and only face image 1 with the highest quality score is selected and added into the candidate image set, re-selection is required, and face image 2 that has the maximum average difference (because at this time, only face image 1 is included in the candidate image set, the average difference is the difference from the predetermined parameter of face image 1) from face image 1 with the highest quality score in a predetermined parameter can be selected and added into the candidate image set; at this time, less than four images are included in the candidate image set, face image 3 that has a maximum average difference from face image 1 and face image 2 in a predetermined parameter continues to be selected, and the operation is repeated to select face image 4. As such, there are four images in the candidate image set, and the iteration can be ended.

It should be understood that in this step, the attributes of face images may be normalized to calculate the average difference of the predetermined parameter. This ensures that there is a large difference between selected face images while the number of candidate face image frames is increased, thereby avoiding noise and improving the accuracy of subsequent comparison results.

S108: Compare the face images in the candidate image set with a stored face image of the target object.

In some embodiments, the comparing the face images in the candidate image set with the stored face image of the target object in S108 can include the following operations: comparing features of each face image in the candidate image set with features of the stored face image of the target object; and performing weighted averaging based on a predetermined number of comparison results.

As such, weighted fusion of the comparison results is performed, which can improve the accuracy of the comparison results.

It should be understood that the stored face image can be stored locally in a system or in a cloud server. If the stored face image is stored locally in the system, each face image in the candidate image set can be compared with the stored face image of the target object stored locally in the system. If the stored face image is stored in the cloud server, the face images in the candidate image set can be sent, e.g., uploaded, to the cloud server and can be compared with the stored face image of the target object one by one, and the comparison result is returned.

In the technical solution according to the present specification, a first face image with the highest quality score is selected from a plurality of obtained face image frames, and added to a candidate image set; based on the first face image, a second face image that has a maximum average difference from all face images in the candidate image set in a predetermined parameter is iteratively selected from the plurality of face image frames, and added to the candidate image set, until the number of images in the candidate image set reaches a predetermined value; and then the face images in the candidate image set are compared with a stored face image of the target object, so that it is ensured that the selected face images have a greater difference while the number of candidate face image frames is increased, thereby avoiding noise and improving the accuracy of comparison results.

In some embodiments, in the implementations of the present specification, the face images include recognizable human face images or recognizable animal face images.

It should be understood that the solution of comparison based on a plurality of face image frames can be applied to payment scenarios (such as face-scanning payment) or authentication scenarios (such as face-scanning access control).

The technical solutions used in the implementations of the present specification are described in detail through specific examples.

Figure 2:
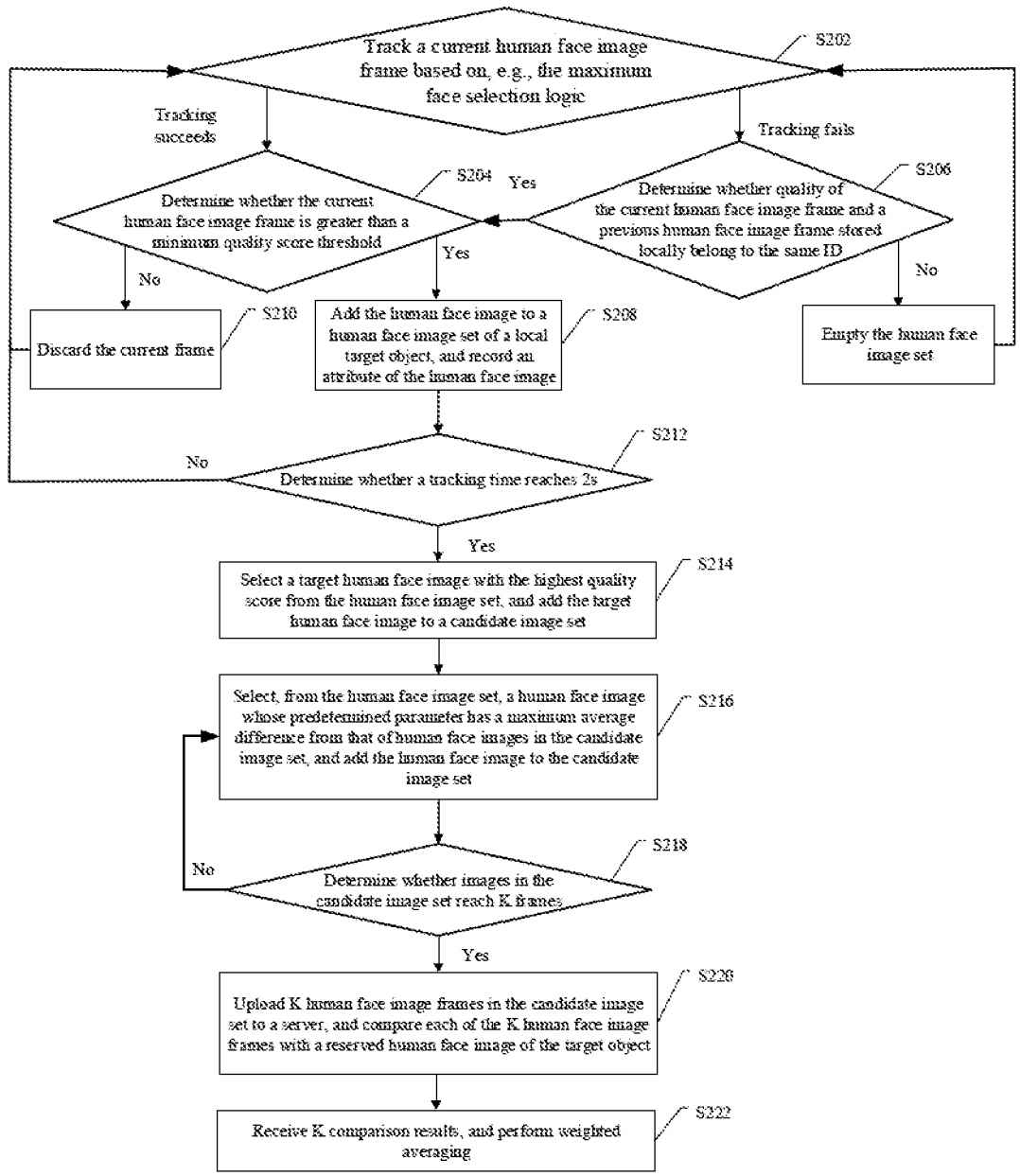
FIG. 2 is a schematic flowchart illustrating a comparison based on a plurality of face image frames according to some other implementations of the present specification.

Referring to FIG. 2, a comparison process based on a plurality of face image frames includes the following steps.

S202: Track a current human face image frame based on, e.g., the maximum face selection logic; if the tracking succeeds, perform S204, otherwise, perform S206.

The maximum face selection logic is only an example herein. The current human face image frame can also be determined and tracked based on other face selection logic. In addition, the implementations of the present specification do not exclude possible presence of animal face images. For example, the face of a user's pet is used as a stored face image, and the pet face can be used for comparison in subsequent payment.

S204: Determine whether quality of the current human face image frame is greater than a minimum quality score threshold; if yes, perform S208, otherwise, perform S210.

S206: Determine whether the current human face image frame and a previous human face image frame stored locally belong to the same ID; if yes, proceed to S204, otherwise, empty a human face image set, and proceed to S202.

In this step 206, if the current human face image frame and the previous human face image frame do not belong to the same ID, the human face image set needs to be emptied, and the tracking is performed again.

S208: Add the human face image to a human face image set of a local target object, and record an attribute of the human face image.

S210: Discard the current frame, and proceed to S202.

S212: Determine whether a tracking time reaches a threshold, e.g., 2s; if yes, perform S214, otherwise, proceed to S202.

S214: Select a human face image with a highest quality score from the human face image set, and add the human face image to a candidate image set.

S216: Select, from the human face image set, a human face image that has a maximum average difference from all human face images in the candidate image set in a predetermined parameter, and add the human face image to the candidate image set.

For this step, references can be made to S106, and details are omitted herein for simplicity.

S218: Determine whether images in the candidate image set reach K frames; if yes, perform S220, otherwise, proceed to S216.

In some embodiments, K=60 frames. Compared with a single face image frame, a face image obtained through tracking for 2s includes richer information, which can improve the accuracy of comparison.

S220: Upload K human face image frames in the candidate image set to a server, and compare the K human face image frames with a stored target human face image of the target object.

S222: Receive K comparison results, and perform weighted averaging.

As such, the weighted average result can be used as the final result of this comparison, and it is determined, based on the comparison result, whether the human face corresponding to the human face image passes the verification.

Figure 3:
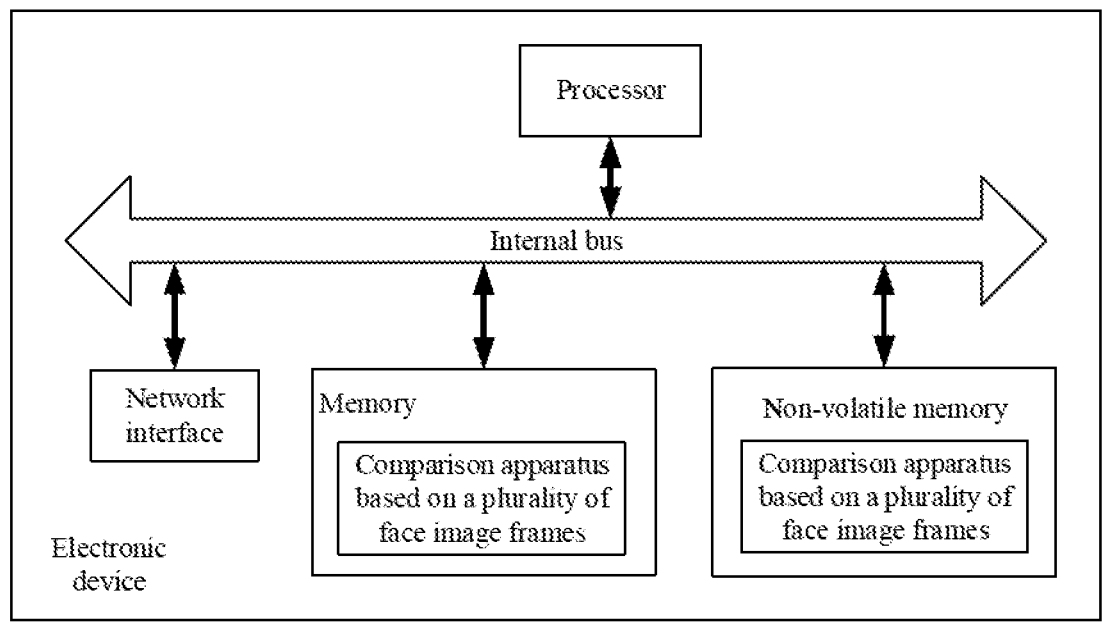
FIG. 3 is a schematic structural diagram illustrating an electronic device according to some implementations of the present specification.

FIG. 3 is a schematic structural diagram of an electronic device according to some implementations of the present specification. Referring to FIG. 3, at the hardware level, the electronic device includes a processor, and in some embodiments, further includes an internal bus, a network interface, and a memory. The memory can include an internal memory, such as a high-speed random-access memory (RAM), and can further include a non-volatile memory, such as at least one disk memory. Certainly, the electronic device can further include hardware required for other services.

The processor, the network interface, and the memory can be connected to each other through the internal bus, which can be an industry standard architecture (ISA) bus, a peripheral component interconnect (PCI) bus, an extended industry standard architecture (EISA) bus, or the like. The buses can fall into an address bus, a data bus, a control bus, and the like. For ease of representation, only one double-headed arrow is used for representation in FIG. 3, but it does not mean only one bus or one type of buses is present.

The memory is configured to store programs. Specifically, the program can include program codes, and the program codes include computer operation instructions. The memory can include the internal memory and the non-volatile memory and provide instructions and data for the processor.

The processor reads a corresponding computer program from the non-volatile memory into the internal memory and then runs the computer program to form a shared resource access control apparatus on the logical level. The processor executes the programs stored in the memory and is specifically configured to perform the following operations: obtaining a plurality of face image frames of a target object; selecting a first face image with a highest quality score from the plurality of face image frames, and adding the first face image to a candidate image set; in response to that a number of images in the candidate image set is less than a predetermined value, iteratively selecting, from the plurality of face image frames, a second face image that has a maximum average difference from all face images in the candidate image set in a predetermined parameter, to add the second face image to the candidate image set; and comparing the face images in the candidate image set with a stored face image of the target object.

The method performed by the comparison apparatus based on a plurality of face image frames as disclosed in the implementations shown in FIG. 1 and FIG. 2 of the present specification can be applied to or implemented by the processor. The processor can be an integrated circuit chip with signal processing capability. In the implementation process, each step of the above method can be completed by an integrated logic circuit of hardware in the processor or instructions in the form of software. The above processor can be a general-purpose processor, which includes a central processing unit (CPU), a network processor (NP), or the like; or can be a digital signal processor (DSP), an application specific integrated circuit (ASIC), a field-programmable gate array (FPGA) or other programmable logic devices, a discrete gate or a transistor logic device, and a discrete hardware component. The disclosed methods, steps, and logical block diagrams in the implementations of the present specification can be implemented or performed. The general-purpose processor can be a microprocessor, or the processor can be any conventional processor or the like. The steps of the method disclosed with reference to the implementations of the present specification can be directly executed by a hardware decoding processor or executed by a combination of hardware and software modules in a decoding processor. The software module can be located in a storage medium mature in the art such as a RAM, a flash memory, a read-only memory, a programmable read-only memory or an electrically erasable programmable memory, or a register. The storage medium is located in the memory, and the processor reads information in the memory and completes the steps of the above method with its hardware.

The electronic device can also implement the method of FIG. 1 and implement the functions of the comparison apparatus based on a plurality of face image frames in the implementations shown in FIG. 1 and FIG. 2. Details are omitted in the implementations of the present specification.

Certainly, the electronic device according to the implementations of the present specification does not exclude other implementations other than software implementations, such as a logic device or a combination of software and hardware. That is, an executor of the following processing flow is not limited to each logic unit, but can also be hardware or logic devices.

In the technical solution according to the present specification, a first face image with the highest quality score is selected from a plurality of obtained face image frames of the target object and added to a candidate image set; based on the first face image, a second face image that has the maximum average difference from all face images in the candidate image set in a predetermined parameter is iteratively selected from the plurality of face image frames, and added to the candidate image set, until the number of images in the candidate image set reaches a predetermined value; and then the face images in the candidate image set are compared with a stored face image of the target object, so that it is ensured that the selected face images have a greater difference while the number of candidate face image frames is increased, thereby avoiding noise and improving the accuracy of comparison results.

The implementations of the present specification further provides a computer-readable storage medium that stores one or more programs including instructions, where when the instructions are executed by a portable electronic device including a plurality of application programs, the portable electronic device is enabled to perform the method according to the implementations shown in FIG. 1, specifically including: obtaining a plurality of face image frames of a target object; selecting a first face image with a highest quality score from the plurality of face image frames, and adding the first face image to a candidate image set; in response to that a number of images in the candidate image set is less than a predetermined value, iteratively selecting, from the plurality of face image frames, a second face image that has a maximum average difference from all face images in the candidate image set in a predetermined parameter, to add the second face image to the candidate image set; and comparing the face images in the candidate image set with a stored face image of the target object.

In the technical solution according to the present specification, a first face image with the highest quality score is selected from a plurality of obtained face image frames of the target object and added to a candidate image set; based on the first face image, a second face image that has the maximum average difference from all face images in the candidate image set in a predetermined parameter is iteratively selected from the plurality of face image frames, and added to the candidate image set, until the number of images in the candidate image set reaches a predetermined value; and then the face images in the candidate image set are compared with a stored face image of the target object, so that it is ensured that the selected face images have a greater difference while the number of candidate face image frames is increased, thereby avoiding noise and improving the accuracy of comparison results.

Figure 4:
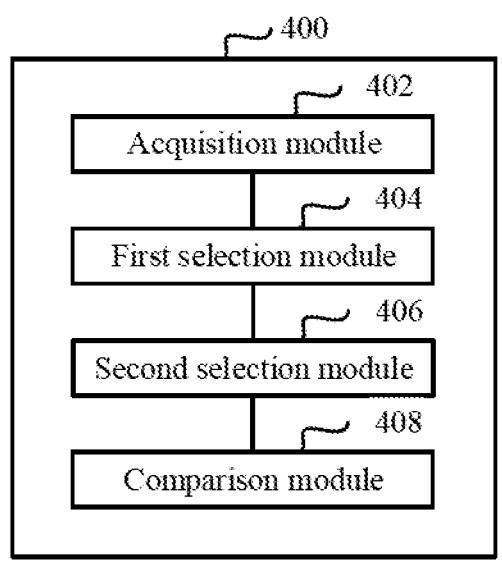
FIG. 4 is a schematic structural diagram illustrating a comparison apparatus based on a plurality of face image frames according to some implementations of the present specification.

FIG. 4 is a schematic structural diagram illustrating a comparison apparatus 400 based on a plurality of face image frames according to some implementations of the present specification. Referring to FIG. 4, in a software implementation, the comparison apparatus 400 based on a plurality of face image frames can include: an acquisition module 402, configured to obtain a plurality of face image frames of a target object; a first selection module 404, configured to select a first face image with a highest quality score from the plurality of face image frames, and add the first face image to a candidate image set; a second selection module 406, configured to: in response to that a number of images in the candidate image set is less than a predetermined value, iteratively select, from the plurality of face image frames, a second face image that has a maximum average difference from all face images in the candidate image set in a predetermined parameter, to add the second face image to the candidate image set; and a comparison module 408, configured to compare the face images in the candidate image set with a stored face image of the target object.

In the technical solution according to the present specification, a first face image with the highest quality score is selected from a plurality of obtained face image frames of the target object and added to a candidate image set; based on the first face image, a second face image that has the maximum average difference from all face images in the candidate image set in a predetermined parameter is iteratively selected from the plurality of face image frames, and added to the candidate image set, until the number of images in the candidate image set reaches a predetermined value; and then the face images in the candidate image set are compared with a stored face image of the target object, so that it is ensured that the selected face images have a greater difference while the number of candidate face image frames is increased, thereby avoiding noise and improving the accuracy of comparison results.

In some embodiments, in an implementation, the acquisition module 402 is specifically configured to: track each shot of face image frame; and obtain face images that meet a quality score threshold based on a tracking result, and record an attribute of each face image frame.

In some embodiments, in an implementation, when obtaining face images that meet a quality score threshold based on a tracking result, the acquisition module 402 is specifically configured to: obtain and use a current face image frame as a face image of the target object, in response to that the tracking succeeds and the current face image frame meets the quality score threshold at a same time.

In some embodiments, in another implementation, when obtaining face images that meet a quality score threshold based on the tracking result, the acquisition module 402 is specifically configured to: in response to that the tracking fails and at a same time a current face image frame is successfully matched with a face image that has been obtained prior to the current frame, and the current face image frame meets the quality score threshold, obtain the current face image frame as a face image of the target object; in response to that the tracking fails and at a same time a current face image frame is at least one of: not successfully matched with the face image that has been obtained prior to the current frame, or not meeting the quality score threshold, re-track a shot of face image frame, and empty the candidate image set.

In some embodiments, in specific implementations of the present specification, the predetermined parameters include at least one of following attributes: quality score, angle, brightness, and light; or, the predetermined parameters are determined based on at least one of the following attributes: quality score, angle, brightness, and light.

In some embodiments, in an implementation, when comparing the face images in the candidate image set with a stored face image of the target object, the comparison module 408 is specifically configured to: compare features of each face image in the candidate image set with features of the stored face image of the target object; and perform weighted averaging based on a predetermined number of comparison results.

In some embodiments, in an implementation, the face images include recognizable human face images or recognizable animal face images.

It should be understood that the comparison apparatus based on a plurality of face image frames according to the implementation of the present specification can further perform the method performed by the comparison apparatus (or device) based on a plurality of face image frames in FIG. 1 to FIG. 2, and implement the functions of implementations of the comparison apparatus (or device) based on a plurality of face image frames in FIG. 1 to FIG. 2. Details are omitted herein for simplicity.

In summary, the above descriptions are only preferred implementations of the present specification and are not intended to limit the protection scope of the present specification. Any modifications, equivalent replacements, improvements, and the like within the spirit and principles of the present specification should fall within the protection scope of the present specification.

The systems, apparatuses, modules, or units illustrated in the above implementations can be implemented by computer chips or entities, or by products with certain functions. A typical implementation device is a computer. Specifically, the computer can be, for example, a personal computer, a laptop computer, a cellular phone, a camera phone, a smartphone, a personal digital assistant, a media player, a navigation device, an email device, a game console, a tablet computer, a wearable device, or a combination thereof.

Computer-readable media include permanent and non-permanent, and removable and non-removable media. Information can be stored by using any method or technology. Information can be computer-readable instructions, data structures, modules of programs, or other data. Examples of storage media of the computer include, but are not limited to, a phase change RAM (PRAM), a static RAM (SRAM), a dynamic RAM (DRAM), other types of RAMs, a read only memory (ROM), an electrically erasable programmable ROM (EEPROM), a flash memory or other memory technologies, a read only optical disk ROM (CD-ROM), a digital versatile disk (DVD) or other optical storage, magnetic cassettes, magnetic tape magnetic disk storage or other magnetic storage devices or any other non-transmission medium, which can be used to store information accessible by computing devices. As defined herein, computer-readable media do not include transitory computer-readable media such as modulated data signals and carrier waves.

It should also be noted that the term "comprise", "include", or any other variant thereof is intended to encompass a non-exclusive inclusion, so that a process, method, product, or device that includes a series of elements includes not only those elements, but also other elements not explicitly listed, or elements that are inherent to such a process, method, product, or device. Without more restrictions, an element defined by the phrase "including a . . . " does not exclude the presence of another same element in a process, method, product, or device that includes the element.

Each implementation in the specification is described in a progressive way, and for the same or similar parts between the implementations, references can be made to each other. Each implementation focuses on differences from other implementations. Particularly, because the system implementation is basically similar to the method implementation, the description is relatively simple, and for the relevant parts, references can be made to partial description of the method implementation.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
   obtaining a plurality of face images of an object;
   selecting a first face image with a highest quality score from the plurality of face images, and adding the first face image to a candidate image set;
   in response to that a number of images in the candidate image set is less than a threshold value, selecting, from the plurality of face images, a second face image that has a maximum average difference from all face images in the candidate image set in a parameter among the plurality of face images, to add the second face image to the candidate image set; and
   comparing face images in the candidate image set with a stored face image of the object.

2. The method according to claim 1, wherein the obtaining the plurality of face images of the object includes:
   tracking each shot of face image; and
   obtaining face images that meet a quality score threshold based on a result of the tracking, and recording an attribute of each face image.

3. The method according to claim 2, wherein the obtaining face images that meet the quality score threshold based on the tracking result includes:
   in response to that the tracking with respect to a target face image succeeds and the target face image meets the quality score threshold, obtaining and using the target face image as a face image of the object.

4. The method according to claim 2, wherein the obtaining face images that meet the quality score threshold based on the tracking result includes:
   in response to that the tracking with respect to a target face image fails and the target face image is successfully matched with a face image that has been obtained prior to the target face image, and the target face image meets the quality score threshold, obtaining the target face image as a face image of the object; and
   in response to that the tracking with respect to the target face image fails and the target face image frame is at least one of: not successfully matched with the face image that has been obtained prior to the target face image, or not meeting the quality score threshold, re-tracking a shot of face image of the object, and emptying the candidate image set.

5. The method according to claim 1, wherein the comparing the face images in the candidate image set with the stored face image of the target object includes:
   comparing features of each face image in the candidate image set with features of the stored face image of the target object; and
   performing weighted averaging based on a determined number of comparison results.

6. The method according to claim 1, wherein the parameter includes at least one of:
   a quality score, an angle of shooting image, brightness, and light; or
   wherein the parameter is determined based on at least one of: the quality score, the angle of shooting image, the brightness, and the light.

7. The method according to claim 1, wherein the face images include recognizable human face images or recognizable animal face images.

8. The method according to claim 1, wherein the selecting, from the plurality of face images, a second face image that has a maximum average difference from all face images in the candidate image set in a parameter among the plurality of face images is conducted iteratively.

9. An apparatus, comprising:
   an acquisition module, configured to obtain a plurality of face images of an object;
   a first selection module, configured to select a first face image with a highest quality score from the plurality of face images, and add the first face image to a candidate image set;
   a second selection module, configured to: in response to that a number of images in the candidate image set is less than a threshold value, select, from the plurality of face images, a second face image that has a maximum average difference from all face images in the candidate image set in a parameter among the plurality of face images, to add the second face image to the candidate image set; and
   a comparison module, configured to compare the face images in the candidate image set with a stored face image of the object.

10. An electronic device, comprising:
    a processor; and
    a memory, configured to store computer-executable instructions, wherein when the executable instructions are executed by the processor, the processor is enabled to perform operations including:
       obtaining a plurality of face images of an object;
       selecting a first face image with a highest quality score from the plurality of face images, and adding the first face image to a candidate image set;

in response to that a number of images in the candidate image set is less than a threshold value, selecting, from the plurality of face images, a second face image that has a maximum average difference from all face images in the candidate image set in a parameter among the plurality of face images, to add the second face image to the candidate image set; and comparing the face images in the candidate image set with a stored face image of the object.

11. The electronic device according to claim 10, wherein the obtaining the plurality of face images of the object includes:

tracking each shot of face image; and obtaining face images that meet a quality score threshold based on a result of the tracking, and recording an attribute of each face image.

12. The electronic device according to claim 11, wherein the obtaining face images that meet the quality score threshold based on the tracking result includes:

obtaining and using a target face image as a face image of the object, in response to that the tracking with respect to the target face image succeeds and the target face image meets the quality score threshold.

13. The electronic device according to claim 11, wherein the obtaining face images that meet the quality score threshold based on the tracking result includes:

in response to that the tracking with respect to a target face image fails and the target face image is successfully matched with a face image that has been obtained prior to the target face image, and the target face image meets the quality score threshold, obtaining the target face image as a face image of the object; and in response to that the tracking with respect to the target face image fails and the target face image frame is at least one of: not successfully matched with the face image that has been obtained prior to the target face image, or not meeting the quality score threshold, re-tracking a shot of face image of the object, and emptying the candidate image set.

14. The electronic device according to claim 10, wherein the comparing the face images in the candidate image set with the stored face image of the target object includes:

comparing features of each face image in the candidate image set with features of the stored face image of the target object; and performing weighted averaging based on a determined number of comparison results.

15. The electronic device according to claim 10, wherein the parameter includes at least one of:

a quality score, an angle of shooting image, brightness, and light; or wherein the parameter is determined based on at least one of: the quality score, the angle of shooting image, the brightness, and the light.

16. The electronic device according to claim 10, wherein the face images include recognizable human face images or recognizable animal face images.

17. The electronic device according to claim 10, wherein the selecting, from the plurality of face images, a second face image that has a maximum average difference from all face images in the candidate image set in a parameter among the plurality of face images is conducted iteratively.

18. A computer-readable storage medium storing one or more programs, wherein when the one or more programs are executed by an electronic device including a plurality of application programs, the electronic device is enabled to perform operations including:

obtaining a plurality of face images of an object;

selecting a first face image with a highest quality score from the plurality of face images, and adding the first face image to a candidate image set;

in response to that a number of images in the candidate image set is less than a threshold value, selecting, from the plurality of face images, a second face image that has a maximum average difference from all face images in the candidate image set in a parameter among the plurality of face images, to add the second face image to the candidate image set; and comparing the face images in the candidate image set with a stored face image of the object.

19. The computer-readable storage medium according to claim 18, wherein the obtaining the plurality of face images of the object includes:

tracking each shot of face image; and obtaining face images that meet a quality score threshold based on a result of the tracking, and recording an attribute of each face image.

20. The computer-readable storage medium according to claim 19, wherein the obtaining face images that meet the quality score threshold based on the tracking result includes:

in response to that the tracking with respect to a target face image succeeds and the target face image meets the quality score threshold, obtaining and using the target face image as a face image of the object;

in response to that the tracking with respect to the target face image fails and the target face image is successfully matched with a face image that has been obtained prior to the target face image, and the target face image meets the quality score threshold, obtaining the target face image as a face image of the object; and in response to that the tracking with respect to the target face image fails and the target face image frame is at least one of: not successfully matched with the face image that has been obtained prior to the target face image, or not meeting the quality score threshold, re-tracking a shot of face image of the object, and emptying the candidate image set.

* * * * *